C. A. BROWN & G. G. EARL.
HYDRAULIC SYSTEM.
APPLICATION FILED FEB. 14, 1914.

1,174,307.

Patented Mar. 7, 1916.

Witnesses

Inventors
C. Arthur Brown
George G. Earl
By
Their Attorney

UNITED STATES PATENT OFFICE.

CHARLES A. BROWN, OF LORAIN, OHIO, AND GEORGE GOODELL EARL, OF NEW ORLEANS, LOUISIANA.

HYDRAULIC SYSTEM.

1,174,307.  Specification of Letters Patent.  Patented Mar. 7, 1916.

Original application filed January 13, 1913, Serial No. 741,637. Divided and this application filed February 14, 1914. Serial No. 818,688.

*To all whom it may concern:*

Be it known that I, CHARLES A. BROWN, a citizen of the United States, residing at Lorain, in the county of Lorain and State of Ohio, and GEORGE G. EARL, a citizen of the United States, residing at New Orleans, in the parish of Orleans and State of Louisiana, have invented a certain new and useful Improvement in Hydraulic Systems; and we do hereby declare the following to be a full, clear, and exact description of the invention, such as will enable others skilled in the art to which it appertains to make and use the same.

The invention relates to hydraulic systems in which a proportional flow may be treated to ascertain the main flow, or to apply a substance thereto.

This application is a division of our application #741,637, filed January 13th, 1913.

One of the objects of our invention is to automatically withdraw a proportional part of the main flow from the main conduit for the desired purpose and return the same to the conduit. We provide apparatus which is actuated by this functional flow for various purposes, and among which are the operation of a recording device, an integrating device, an indicating device, a periodicimeter or means for supplying a substance, such as a chemical to the flow. Any one or more of these may be operated by the same functional flow.

Another object of our invention is to provide means for maintaining the pressures on either side of a movable controlling member equal or substantially equal. Where diaphragms are employed, this advantage is of great importance, owing to the limited range of motion through which such diaphragms may be successfully moved.

In the particular embodiment illustrated in this application, the functional flow is returned to the main after operating the apparatus. In this particular embodiment, the functional flow is also moved in a direction reversed to the direction of the flow through the main conduit.

Other objects of our invention and the invention itself will be clear from the description of the particular embodiment illustrated.

Figure 1:
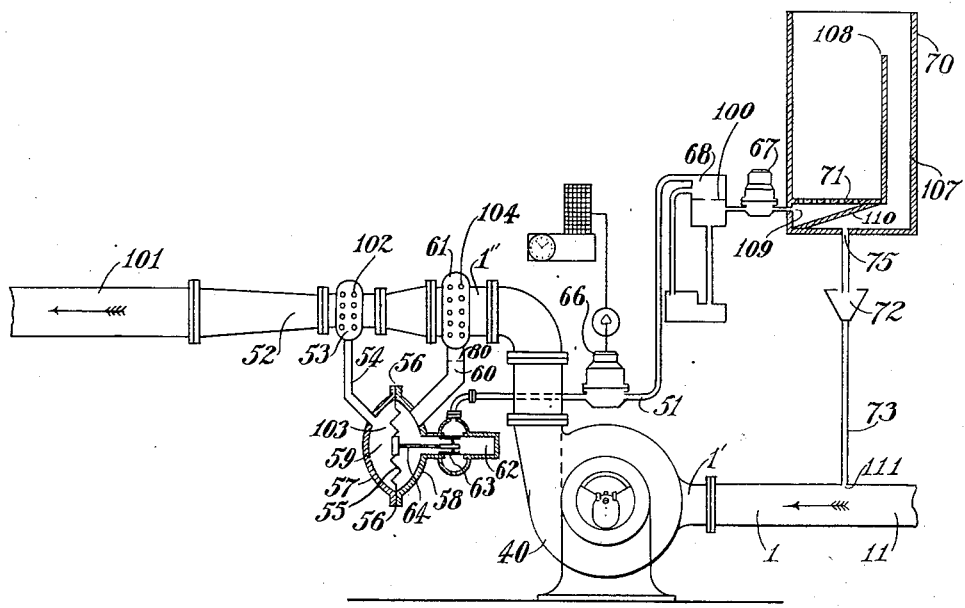
Figure 2:
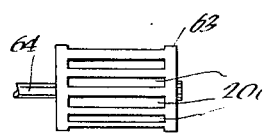

Figure 1 is a diagrammatic illustration of an embodiment of our invention, showing part of the apparatus in elevation and part in section. Fig. 2 is a view of a valve employed to control the functional flow of the particular embodiment.

Referring now to the drawing and the embodiment of our invention illustrated therein, at 1 we show the main conduit, which is adapted to convey a fluid from a source, not shown, through the sections 1' and 101 and the apparatus intermediate thereto and ultimately to a destination, which is not shown. At 40 we show a pump, here illustrated as a rotary pump, which is adapted to force the fluid through the conduit. The suction part of this pump is shown at 1' and the discharge part at 1''. We provide means for creating from the flow in the main conduit a functional flow, conducting it in a direction reversed to the direction in the main flow, and re-introducing it into the main conduit. In the form of our invention shown, the means for creating this functional flow is applied to the main conduit adjacent the discharge part of the pump.

At 51 is illustrated a duct or by-pass for the functional flow, which may be returned to the main conduit, preferably adjacent the suction part of the pump. At 52 we show means for creating a special pressure in the main which is here shown as a Venturi tube. We prefer to use a pressure chamber 53 at the Venturi tube with a screen 102 to prevent foreign matter entering the duct 54. Means are provided for taking advantage of the pressure created by the Venturi tube and that in the main for the purpose of establishing a functional flow. Such means are shown at 103, and here consist of a movable member, such as a diphragm 55, whose edges are clamped at 56 between the edges of the sections 57 and 58 of the chamber 59. The chamber is thus divided into two pressure cells by the diaphragm. At a suitable point in the main conduit, here shown between the Venturi tube and the pump, we provide a pressure chamber 61, which is also preferably provided with a screen 104 for a purpose similar to that of 102. A duct 60 leads from this pressure chamber to one side of the movable member 55, and a duct 54 leads from the pressure chamber of the Venturi tube to the other side of 55. At 80 in the duct 60 we show an orifice which offers resistance to the flow of fluid through the duct 60.

At 62, we show a valve chamber which communicates with the chamber 59, preferably adjacent the entrance of the duct 60 to said chamber. A valve 63 is shown in this chamber. We have illustrated in the drawing a well known form of valve, generally spoken of as a gridded valve, which consists of a cylinder whose sides are guided by means of slots 200, though any suitable type of valve may be employed. The length of the opening is controlled by the position of the valve, which is controlled by the position of the member 55.

A duct 51 leads from the discharge side of the valve chamber to the apparatus to be actuated. We have shown a diagrammatic representation of a periodicimeter at 66, a manometer at 68 and a meter at 67. At 70 we have illustrated a device for supplying chemicals or other substances to the functional flow. We do not wish to be limited to the arrangement shown at 70, as any suitable form may be employed, unless the limitations placed upon the claims forbid.

The periodicimeter consists of apparatus adapted to measure the time period elapsing during which a definite quantity of fluid passes and to indicate the same. One embodiment of this device is illustrated and described in the parent application.

In the form shown, the member 70 consists of a tank 107. In this tank we show a baffle plate 108 and a grid 71. The substance which it is desired to introduce into the functional flow is placed in the receptacle formed by the baffle 108 and the grid 71. The fluid enters at 109 and is directed by a partition 110 through the grid 71, where it absorbs or otherwise takes up the substance, flows over the top of the baffle plate 108 through the orifice 75 and back to the main through a duct 73 and an orifice 111. We have shown a funnel 72 in the duct 73 in the form illustrated.

An orifice 100 is shown in the manometer 68, which also offers a resistance to the functional flow of fluid. We may locate this orifice and the orifice at 80 in any suitable position in the course of the flow between 61 and 111.

The operation of the apparatus illustrated in the drawing is as follows: The pump 40 is operated, causing fluid, for example, raw water, to flow through the main conduit 1, as illustrated by the arrows. A portion of the main flow is diverted at 61 and shunted through the pipes 51 and 73. The pressure from the Venturi tube is exerted upon one side of the diaphragm and the pressure from the main is exerted through the duct 60 upon the other side, each exerting a pressure upon the diaphragm. As long as the pressures are in balance, the member 55 and the valve will remain stationary, so that the functional flow will remain constant. The tendency of the functional flow to exert a pressure upon the member 55 will be overcome by the resistance offered by the orifices in the path of the functional flow. Should there be a change in the rate of flow through the main, the relation between the pressures exerted upon the member 55 will be changed, so that the member 55 and the valve will be operated either to reduce or increase the functional flow, depending upon whether the rate of flow through the main is increased or decreased, so that the flow through the shunt will always be proportional to that through the main conduit. This functional flow will operate the periodicimeter, the manometer or the meter in a manner too well known to be described here, and will operate the chemical device in a manner already described.

When the valve is opened or closed, the variations in flow caused thereby will change the pressures in the cell or chamber, through which it flows, and thereby automatically maintain the pressures on the two sides of the diaphragm equal.

While we have illustrated this particular form of our invention, we do not wish to be limited thereto, but contemplate numerous and extensive departures from the details thereof, consistent with the language of the claims.

We claim:—

1. In a device of the class described, the combination of a conduit through which fluid flows under pressure, means to automatically withdraw at a high pressure point a portion of such fluid from the conduit, mechanism for maintaining the portion withdrawn proportional to the flow in the conduit, and apparatus to conduct said withdrawn portion to a point of lower pressure in said conduit and return it to the conduit.

2. In a device of the class described, the combination of a conduit through which fluid may flow, means for automatically withdrawing a portion of the fluid flow from a point of relatively high pressure in the main part of the conduit, a device for conducting the fluid thus withdrawn, a hydraulically responsive device associated with said conducting device and responsive to the flow of fluid through said conducting device, movable means for maintaining the flow through the conducting device proportional to the flow through the main conduit and means for returning the proportional flow to the main conduit at a point of relatively low pressure.

3. In a fluid regulating system, a fluid chamber, a fluid-tight movable division in said chamber creating thereof two pressure cells, a source of fluid pressure connected with, and creating in one of said cells a varying static fluid pressure, a source of higher pressure and an outlet of lower pressure than the said varying static fluid pressure, a fluid passage-way from said source to said outlet connected with the other of said pressure cells between said source and said outlet, and means including a valve operated by said movable division governing the flow of fluid from said source to said outlet to maintain the static pressure in the last named pressure cell equal to the varying static pressure in the first named cell.

4. In a device of the class described, the combination of a pressure chamber, a movable member in said chamber dividing said pressure chamber into a plurality of pressure cells, means to convey a varying fluid pressure to one of said cells, means to convey a plurality of varying fluid pressures directly to the other of said cells, and mechanism controlled by said member for maintaining the pressures in the two cells equal through variations in said pressures.

5. In a device of the class described, the combination of a main conduit through which fluid may flow, a shunt to a portion of the conduit through which a part of the flow passes from a point of relatively high to a point of relatively low pressure reverse in direction to the fluid in the conduit, movable means for maintaining such part proportional to the flow through the main conduit parallel to the shunt, and means for indicating the quantity flowing through the shunt.

6. In a device of the class described, the combination of a main conduit through which fluid flows, means applied at a relatively high pressure point in said conduit for withdrawing a proportional part of the flow from said conduit, movable means for maintaining said withdrawn part proportional to the main flow, means for returning such flow at a relatively low pressure point in said conduit, a duct for conducting the proportional flow from the exit point to the reëntrant point and mechanism for recording the portion which flows through the duct.

7. In a device of the class described, the combination of a conduit conducting a flow of fluid, means for creating a flow of fluid in the conduit, a movable member, means for conducting the static pressure of the fluid in the conduit to said movable member, means for communicating the velocity pressure in said conduit to said member, a duct communicating with one of said pressure communicating means adapted to conduct a flow of fluid functional to the flow in the conduit, said duct being controlled by said movable member, a resistance device in the path of the fluid flowing through said duct and offering a resistance to the flow of fluid therethrough and apparatus in said duct actuated by the flow therethrough.

8. In a device of the class described, the combination of a fluid conduit adapted to convey fluid, a source of pressure for causing the fluid to flow through the conduit, a duct leading from said conduit, mechanism controlling the flow of fluid through said duct, means controlling said mechanism, means for communicating the static and velocity pressures in said conduit to said mechanism controlling means, resistance means for opposing the flow of fluid through said duct and apparatus actuated by the flow through the duct.

9. In a device of the class described, the combination of a fluid conduit through which fluid flows, a pressure cell, means to convey pressure in the conduit to said pressure cell, a second pressure cell, means to convey the velocity pressure in the conduit to the second pressure cell, a duct communicating with one of said cells through which fluid flows from the conduit, means controlling said duct, means governed by the pressure in said cells controlling said first named means and apparatus for compensating for the loss of pressure in the cell due to the flow therefrom into the duct.

10. In a device of the class described, the combination of a fluid main through which fluid flows, a plurality of pressure cells, means to convey the static pressure in the main to one cell, means to convey the velocity pressure to another cell, a movable member controlled by the pressures in said cells, a duct leading from one of said cells, a valve controlling said duct and operated by the movable member and apparatus for offering a compensating resistance to the flow through the duct.

11. In a device of the class described, the combination of a fluid main through which fluid flows, a plurality of pressure cells, means for conveying pressure in the main to one of said cells, means to convey the velocity pressure in said main to another of said cells, a duct communicating with the first named cell adapted to convey fluid therefrom, a valve controlling said duct, a movable member controlled by the pressure in said cells for operating said valve said duct being provided with an orifice in the path of the fluid flowing through the duct for compensating for the loss of pressure in the first named cell due to such flow.

12. In a device of the class described, the combination of a fluid conduit through which fluid flows, a plurality of pressure cells, a duct for communicating pressure in the conduit to one of said cells, a Venturi tube in said conduit, a duct connecting said Venturi tube to a second cell, a vibratile diaphragm between said cells, a third duct communicating with said first named pressure cell, a valve in said duct operated by said movable diaphragm said third duct being provided with an orifice in the path of fluid flowing through said third duct for compensating for the loss of pressure in the first named cell due to the flow through the third duct.

13. In a device of the class described, the combination of a fluid conduit through which fluid flows, a pressure cell, a duct in shunt to a portion of the conduit, said pressure cell communicating with the conduit, means controlled by the pressures in said cells controlling the flow through the duct, said duct communicating with said pressure cell and means for compensating for the loss of pressure in the pressure cell due to the flow through the shunting duct.

14. In a device of the class described, the combination of a conduit conducting a flow of fluid, a pump in the conduit, a duct shunting a part of said conduit, constantly withdrawing a proportional part of the flow from the discharge of the pump and returning it to the conduit at a point on the suction side of the pump and means to indicate the quantity of the flow through the shunting duct.

15. In a device of the class described, the combination of a main conduit, a pressure cell communicating with said main conduit, a second pressure cell communicating with said main conduit, a duct for conveying fluid communicating with one of said pressure cells, mechanism governed by the fluid pressures in said cells and means controlled by said mechanism governing the flow through the duct.

16. In a device of the class described, the combination of a fluid main having a reduced section, of a casing disposed adjacent the main and including two compartments, means for establishing open communication between one of said compartments and the full section of the main, a connection between the reduced section of the main and the other compartment, a pipe communicating with one of said compartments adapted to convey a flow of fluid, a valve in said pipe controlling the flow of fluid therethrough, a vibratory member operated by the pressures in said compartments and a valve stem connecting said valve to said vibratory member whereby said member operates said valve.

17. In a device of the class described, the combination of a main conduit, a pressure cell communicating with said main conduit, a second pressure cell communicating with said main conduit, a duct in shunt to a portion of the main conduit communicating with one of said pressure cells, mechanism governed by the fluid pressure in said cells and means controlled by said mechanism governing the flow of fluid through said duct.

18. In a device of the class described, the combination of a main conduit, a pressure cell, means to transmit into said cell the static pressure in the conduit, a second pressure cell, means to transmit into the second cell the velocity pressure in the conduit, a duct in shunt to a portion of the main conduit communicating with one of said cells and mechanism responsive to variations of pressure in said cells controlling said shunt duct.

19. In a device of the class described, the combination of a fluid conduit, a movable member, means including a duct to transmit a fluid pressure from the conduit to one side of said movable member, means including a second duct to transmit another fluid pressure from said conduit to the other side of said movable member, apparatus in said last named duct creating a restriction to fluid flow therein and mechanism controlled by said movable member to maintain the pressures on the opposite sides of said member in equilibrium.

20. In a device of the class described, the combination of a pressure chamber, a movable diaphragm dividing said pressure chamber into two pressure cells, a plurality of sources of varying fluid pressure, means to convey a varying fluid pressure from one of said sources to one of said cells, whereby it acts upon one side of said diaphragm, means to convey a plurality of fluid pressures from other of said sources of pressure to the other of said pressure cells, whereby they act upon the other side of said diaphragm, and mechanism including a valve for maintaining the pressure in the second named cell acting upon the side of the diaphragm exposed in said second cell equal to the pressure exerted upon the other side of the diaphragm.

21. In a fluid regulating system, the combination of a pressure chamber, a fluid-tight, movable division therein dividing said chamber into two pressure cells, two sources of governing fluid pressure and means to connect each source with a different one of said cells only, a third source of fluid pressure and means to connect said source with one of said cells and mechanism including a valve controlled by said movable division and governing the flow of fluid from said third source to maintain the pressures in said cells equal to each other.

22. In a device of the class described, the combination of a pressure chamber, a movable member in said chamber dividing it into two cells, means to convey a varying fluid pressure to one of said cells, means to hydraulically convey a plurality of varying pressures to the second of said cells, and mechanism controlled by said movable member for maintaining the pressures in said cells equal.

23. In a device of the class described, the combination of a plurality of sources of varying fluid pressure, a pressure chamber, a movable diaphragm dividing said pressure chamber into two cells, means to convey a fluid pressure from one of said sources to one of said cells, whereby said pressure acts upon one side of said diaphragm, means for hydraulically conveying fluid pressures from a plurality of said sources to the other of said cells, whereby it acts upon the other side of said diaphragm and means including a valve controlled by said diaphragm for maintaining the pressures in said cells equal to each other.

24. In a device of the class described, the combination of a plurality of sources of fluid pressure, a pair of pressure sells, a movable member between said cells, means to convey a fluid pressure from one of said sources to one of said cells, means to convey fluid pressures from a plurality of said sources to the other of said cells, said pressures when introduced into said cells acting upon said movable member, and mechanism controlled by said movable member for maintaining the pressure in each cell equal to that in the other.

25. In a device of the class described, the combination of a plurality of sources of varying fluid pressures, a pressure chamber, a movable member dividing said pressure chamber into two pressure cells, means to convey fluid pressure from one of said sources to one of said cells, whereby said pressure acts upon one side of said movable member, means to convey fluid pressure from a plurality of said sources to the other of said cells, whereby it acts upon the other side of said member, and mechanism including a valve controlled by said member for maintaining the pressure in one of said cells equal to the pressure in the other.

26. In a device of the class described, the combination of a plurality of sources of fluid pressure, a pressure chamber, a flexible diaphragm dividing said chamber into two pressure cells, means to convey fluid pressure from one of said sources to one of said cells, whereby it acts upon one side of said diaphragm, means to convey fluid pressures from a plurality of said sources to the other pressure cell, whereby it acts upon the other side of said diaphragm and mechanism including a valve controlled by said diaphragm for maintaining the pressure in the second cell equal to the pressure in the first cell.

27. In a device of the class described, the combination of a pressure chamber, a movable member in said chamber dividing it into two cells, means to convey the effects of a varying fluid pressure to one of said cells, means to hydraulically convey the effects of a plurality of varying pressures to the second of said cells and mechanism controlled by said movable member for maintaining the pressures in said cells equal.

28. In a device of the class described, the combination of a pressure chamber, a movable member in said chamber dividing it into two cells, a plurality of sources of pressure, a duct connecting one of said sources to one of said cells, affecting the pressure in said cell, ducts connecting the other cell to a plurality of said sources of pressure, affecting the pressure in said cell, and mechanism controlled by said movable member for maintaining the pressures in said cells equal.

29. In a fluid regulating system, the combination of a source of fluid pressure, two discharging members drawing fluid flow therefrom, adapted to cause a loss of pressure proportional to the square of the quantity of fluid flow therethrough, two pressure cells, means to connect each cell to the low pressure side of one of said discharging members, the pressure within each cell being equal to the fluid pressure on the low pressure side of the discharging member to which it is connected, each of said discharging members provided with an outlet on the low pressure side thereof, a movable member affected by the pressures in said cells, means to withdraw from one of said discharging members an independently varying flow and a valve governed by said movable member controlling the flow through the other of said discharging members.

30. In a fluid regulating system, the combination of a source of fluid pressure, two discharging members connected therewith, each adapted to create two static fluid pressures whose difference is proportional to the square of the quantity of flow therethrough, having a common source of high pressure, a fluid chamber, a fluid-tight movable division in said chamber dividing it into two fluid pressure cells, one of said discharging members being provided with an outlet on the low pressure side, connections thereof from one of said cells to the low pressure created by one of said discharging members, connections from the other of said cells to the low pressure created by the other of said discharging members, means to withdraw an independently varying fluid flow from one of said discharging members and apparatus including a valve operated by said movable division to govern the flow from said outlet.

31. In a fluid regulating system, a fluid chamber, a fluid-tight division therein dividing said pressure chamber into two pressure cells, said division adapted to move freely through a finite range of motion from the greater toward the lesser of the fluid pressures in the two cells, so long as any finite difference exists between the pressures in said cells, means to apply to one of said cells a varying fluid pressure, a source of higher fluid pressure and an outlet of lower fluid pressure than said varying fluid pressure, a fluid passage-way from said source to said outlet, a connection from said passage-way to the other of said fluid pressure cells, and means including a valve in said passage-way operated by the movable division to govern the flow of fluid from said source to said outlet and thereby maintain the static fluid pressure in the second named cell equal to the varying static fluid pressure in the first named cell.

32. In a fluid regulating system, a fluid chamber, a freely movable fluid-tight division therein creating thereof two fluid pressure cells, means to apply to one of said cells a varying static fluid pressure, a source of fluid pressure and an outlet for fluid flow of adequate high and low pressure range, a passage-way for fluid flow from said source to said outlet, means in said passage-way to produce two static fluid pressures whose difference is proportional to the square of the quantity of flow through said passage-way, a connection from said passage-way to the other of said pressure cells communicating thereto one of said last named static fluid pressures, and means including a valve operated by the movable division governing the flow of fluid in said passage-way.

In witness whereof, we have affixed our signatures in the presence of two witnesses this 29th day of September, 1913.

CHARLES A. BROWN.

Witnesses:
G. A. RESEK,
LAURA M. GRUBBS.

GEORGE GOODELL EARL.

Witnesses:
JOHN C. BARTLEY,
S. E. HOLLINGER.